United States Patent [19]

Hadermann et al.

[11] 3,871,990

[45] Mar. 18, 1975

[54] ELECTROOSMOTIC OSMOMETER

[76] Inventors: Albert F. Hadermann, Rt. 1, Ijamsville, Md. 21754; Paul F. Waters, 3318 45th St., N.W., Washington, D.C. 20016; Jung Woo Woo, 2008 N. Adams, Arlington, Va.

[22] Filed: Oct. 15, 1973

[21] Appl. No.: 406,268

[52] U.S. Cl............... 204/301, 73/516 LM, 310/2
[51] Int. Cl........................................... B01d 13/02
[58] Field of Search ............... 204/180 P, 151, 301; 73/516 LM; 310/2

[56] References Cited
UNITED STATES PATENTS

| | | |
|---|---|---|
| 2,661,430 | 12/1953 | Hardway, Jr............................ 310/2 |
| 2,769,929 | 11/1956 | Hardway, Jr............................ 310/2 |
| 2,824,292 | 2/1958 | Christoph ........................... 310/2 X |
| 3,050,665 | 8/1962 | Hurd............................... 204/301 X |
| 3,065,365 | 11/1962 | Hurd et al............................. 310/2 |

Primary Examiner—John H. Mack
Assistant Examiner—A. C. Prescott
Attorney, Agent, or Firm—Joseph P. Nigon

[57] ABSTRACT

An apparatus for use in determining the molecular weight of a non-volatile solute in solution and more particularly to an electroosmotic osmometer employing an electroosmotic pressure source to produce a pressure serving to balance the osmotic pressure of the test solution, is disclosed.

4 Claims, 2 Drawing Figures

PATENTED MAR 18 1975          3,871,990

ELECTROOSMOTIC OSMOMETER

BACKGROUND OF THE INVENTION

It is known that a very high electroosmotic pressure is generated in solutions of a weak electrolyte in an alcohol in contact with a porous material, e.g., water in isopropanol in contact with γ-alumina. The graph of electroosmotic pressure vs. applied potential characteristic of the before mentioned electroosmotic system is a strong non-linear function of the applied potential and several atmospheres of pressure are observed at 40 kV. A dry isopropanol/γ-alumina system exhibits a linear relationship between the electroosmotic pressure and the applied potential but the electroosmotic pressure is of a much lower magnitude at a given value of the applied potential. Both types of systems, however, characteristically draw microamperes in the 0 to 75 kV range and are inherently stable when properly prepared.

The prior art apparatus does not involve the equilibration of the osmotic pressure of the solution against an electroosmotically engendered pressure. Most of the apparatus developed for determining molecular weight involve indirect thermal methods rather than the direct use of the relationship:

$$\pi = cRT + Bc^2$$

where $\pi$ is the osmotic pressure of the solution relative to pure solvent, $c$ is the solute concentration in moles/liter, R is the gas constant, T is the absolute temperature and B is the second virial coefficient. Apparatus based on thermal measurement operate on the principle of vapor pressure lowering and the consequent development of a temperature differential as follows: A solution of a non-volatile solute will always have above it a lower vapor pressure than that of the pure solvent. When a solution and its solvent are compared in a closed, conditioned chamber saturated with the solvent vapor, a differential mass transfer will occur between the two because of the difference in vapor pressure. Such transfer leads to the establishment of a temperature differential proportional to the solute concentration. This temperature has been measured by means of thermally sensitive elements in conjunction with electrical bridge circuits. Calibration curves serve to link the temperature change to the number of moles in the solution. Such apparatus requires considerable time and precise manual dexterity for operation. The measured quantity is only indirectly related to the osmotic pressure of the test solution.

Other existing apparatus based on the temperature change method involve the placement of solvent and solution drops on thermistors and the measurement of the resulting temperature differential. Measurements must be made with the temperature of the chamber held to a precision of less than ±0.001°C. The inherent difficulties associated with the measurement of a small temperature difference are overcome in the present invention.

It is the main object of this invention to provide apparatus for use in determining the molecular weights of solutes in solution, which apparatus overcomes the problems associated with thermal methods for providing the same information.

It is another purpose of this invention to provide apparatus for accurately measuring the osmotic pressure of a solution under the zero-mass transfer constraint by applying an electroosmotic pressure to counterbalance the osmotic pressure at constant temperature resulting in a measurement of solution osmotic pressure under said boundary condition of zero net flow across a semipermeable membrane, typically of cellulose acetate. Thus, it is another purpose of this invention to provide apparatus for accurately measuring the osmotic pressure of a solution under the condition of zero net transfer of solvent to the solution through the semipermeable membrane and to use an optical sensor and a servomechanism to accomplish this end.

An object of the present invention is to maintain zero net flow by means of said servomechanism controlling the potential applied to the electroosmotic pressure source serving to counter the solution osmotic pressure.

It is an object of the present invention to use an optical device to serve as a sensor to detect the displacement of a flexible diaphragm located between the osmotic pressure source and the electroosmotic pressure source.

It is an object of the present invention to provide an optical path to the displacement device by means of fiber-optic light guides so as to ensure adequate thermostating of the osmotic and electroosmotic portions of the invention while permitting easy transfer of the light signal to the light detector at locations removed from the osmotic and electroosmotic cells.

It is an object of the present invention to display the osmolality directly or indirectly on an analog or digital voltmeter.

Other objects and advantages will become apparent from the description of the following FIGURES.

Figure 1:
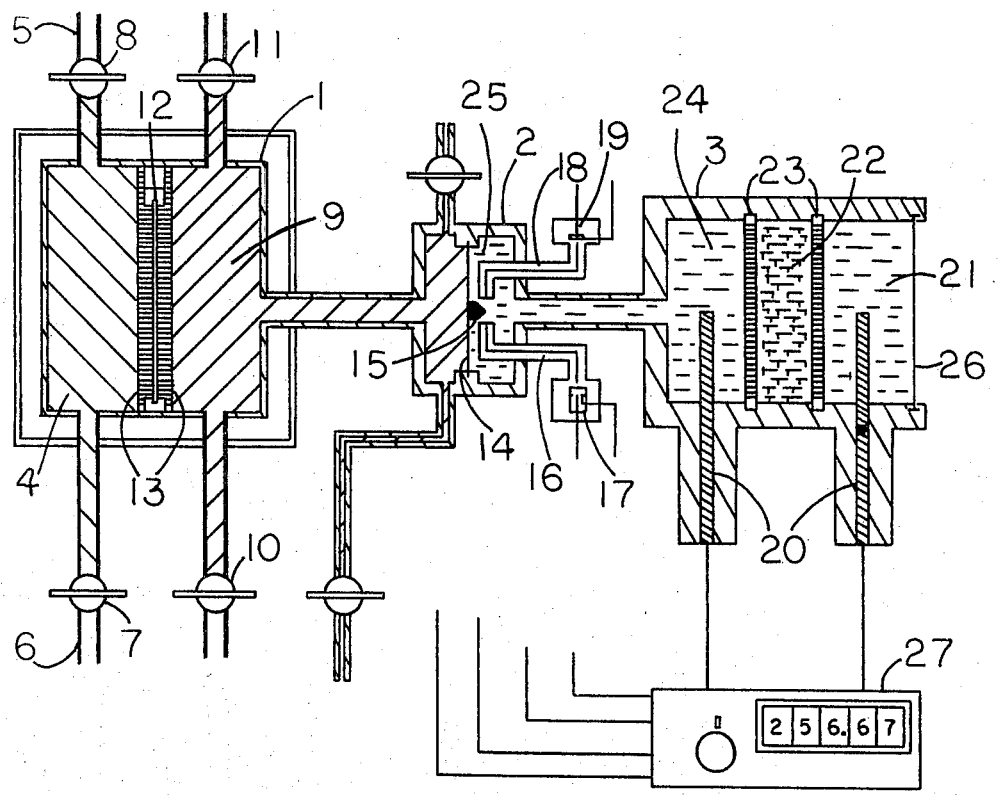
FIG. 1 is a schematic diagram, in cross-section, to illustrate the operating principle of the electroosmotic osmometer.

FIG. 1 consists of three main sections. An osmometer section, 1, is hydraulically coupled to a sensor section, 2, which is in turn hydraulically coupled to an electroosmotic pressure source, 3. The pure solvent is placed in compartment, 4, through ports, 5, and, 6, with care being taken to exclude all air pockets. Valves, 7, and, 8, are then closed. The solute in the solvent is placed in compartment, 9. with care being taken to exclude all air pockets and valves, 10, and, 11, are closed. Semipermeable membrane, 12, is sandwiched between two rigid supports of porous glass or teflon, 13. An osmotic pressure difference is established across the semipermeable membrane, 12, and the increase in pressure tends to displace the thin, flexible silicone or teflon (impermeable) membrane, 14, in sensor chamber, 2, which pushes opaque knife-edge 15, into the beam of light emanating from fiber-optic light guide, 16, in optical communication with light-emitting diode, 17. The light beam is interrupted and no light passes through fiber-optic light guide, 18, to the photodiode or photoconductor, 19. This condition results in the energizing of a servomechanism connected to a variable transformer feeding the primary of a power supply applying a difference of potential to electrodes, 20, of the electroosmotic pressure source, 3, resulting in the establishment of an electroosmotic pressure difference from chamber, 21, through porous region, 22, between rigid, porous supports, 23, to chamber, 24, in communication with chamber, 25. The electroosmotic pressure forces membrane, 14, and knife-edge, 15, out of the light beam resulting in termination of the action of the servomechanism. The impermeable membrane, 26, is provided to permit slight movement of the driver fluid as equilibrium is established. The potential applied to the electrodes in, 3, is read at the voltmeter, 27, in volts, mm of Hg or milliosmoles.

Figure 2:
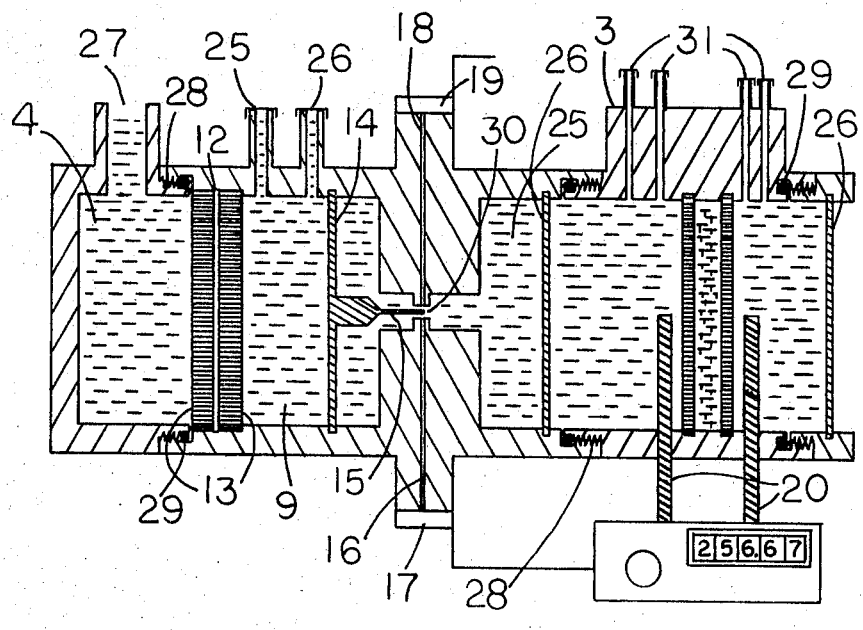
FIG. 2 is a cross-section of a cylindrical apparatus containing the osmotic pressure generator and the electroosmotic pressure generator in a rugged, disassembleable unit.

FIG. 2 is a cross section of a practical cylindrically symmetric osmometer-electroosmometer cell which can be immersed in a thermostatic compartment. The solution is introduced to compartment, 9, through ports, 25, or, 26, and the solvent is introduced at port, 27, to chamber, 4. The semipermeable membrane, 12, is sandwiched between porous glass or teflon supports, 13. Chamber, 4, is mounted on the body of the osmotic portion of the cell by means of threaded portion, 28, and a seal is accomplished with teflon "O" ring, 29. The impermeable silicone or teflon diaphragm, 14, and the knife-edge, 15, are normally displaced towards the optical cavity, 30, by the osmotic pressure generated across the semipermeable membrane, 12. This results in an interruption of the light beam emanating from the fiber-optic guide, 16, and the light-emitting diode element, 17.

The interruption in the beam leads to a zero-light condition in the fiber-optic guide, 18, and at the photosensor, 19, and the servomechanism applies a difference of potential to electrodes, 20, located in electroosmotic pressure source, 3. The electroosmotic assembly is provided with thin flexible impermeable membranes of silicone or teflon, 26, so that the electroosmotically engendered pressure is transferred to chamber, 25, resulting in a driving of membrane, 14, and knife-edge, 15, out of the optical path resulting in a shut-down of the servomechanism controlling the potential applied to the electrodes of the electroosmotic driver. The fluid in chamber, 25, is a silicone-base polymer. The other parts of the electroosmotic driver are as indicated in the explanation of FIG. 1 with the exception of the filling and emptying terminations, 31, the threaded portions, 28, and the teflon "O" rings, 29, for sealing and providing ease of disassembly when required. Disassembly of chamber, 4, at threaded portion, 28, provides convenient access to the semipermeable membrane.

What is claimed is:

1. An electroosmotic osmometer which comprises in combination a housing containing a solution chamber, a solvent chamber adjacent to said solution chamber and separated therefrom by a semi-permeable membrane, a sensor chamber connected to said solvent chamber, said sensor chamber separated into two sections by an impermeable membrane, an opaque knife edge positioned adjacent to said impermeable membrane in said second section, and movable by movement of said impermeable membrane, a fiber optic light system sensitive to movement of said knife edge, an electroosmotic pressure source containing three chambers said first chamber connected to said second section of said sensor chamber, a porous membrane separating said first chamber from said second chamber, a second porous membrane separating said second chamber from said third chamber, electrodes positioned in said first and third chambers, said electrodes connected to a variable transformer actuated by a servomechanism operably connected to said fiber optic light system, and voltmeter connected to said electrodes which measures the potential applied to said electrodes.

2. The osmometer according to claim 1 wherein the fiber optic light system consists of an optical displacement sensor a light emitting diode and a photosensor.

3. The osmometer according to claim 2 wherein the photosensor is a photodiode.

4. The osmometer according to claim 2 wherein the photosensor is a photo-conductive device.

* * * * *